(12) United States Patent
Hsiao et al.

(10) Patent No.: US 10,531,579 B2
(45) Date of Patent: Jan. 7, 2020

(54) DISPLAY APPARATUS, BACKPLANE AND MOLD FOR MAKING BACKPLANE BRACKET

(71) Applicant: Shenzhen China Star Optoelectronics Technology Co., Ltd., Shenzhen, Guangdong (CN)

(72) Inventors: Yu-chun Hsiao, Guangdong (CN); Taiyong Yin, Guangdong (CN); Guofu Tang, Guangdong (CN); Quan Li, Guangdong (CN); Gang Yu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 571 days.

(21) Appl. No.: 15/109,639

(22) PCT Filed: May 20, 2016

(86) PCT No.: PCT/CN2016/082810
§ 371 (c)(1),
(2) Date: Jul. 3, 2016

(87) PCT Pub. No.: WO2017/190376
PCT Pub. Date: Nov. 9, 2017

(65) Prior Publication Data
US 2018/0110134 A1  Apr. 19, 2018

(30) Foreign Application Priority Data
May 6, 2016 (CN) .......................... 2016 1 02983396

(51) Int. Cl.
*G02F 1/1333* (2006.01)
*H05K 7/18* (2006.01)
(Continued)

(52) U.S. Cl.
CPC .......... *H05K 5/0017* (2013.01); *B29C 59/02* (2013.01); *G02F 1/017* (2013.01); *G02F 1/13* (2013.01);
(Continued)

(58) Field of Classification Search
CPC ............. G02F 1/1333; G02F 1/133308; G02F 2001/133314; G02F 2001/133328;
(Continued)

(56) References Cited

U.S. PATENT DOCUMENTS 8,488,078 B2 * 7/2013 Kim .................. G02F 1/133308
349/56
8,749,728 B2 * 6/2014 Zhang ............... G02F 1/133308
349/58

(Continued)

FOREIGN PATENT DOCUMENTS

CN         2840103 Y     11/2006
CN      101823106 A      9/2010
JP      2003050549 A      2/2003

*Primary Examiner* — Tan Le
(74) *Attorney, Agent, or Firm* — Andrew C. Cheng

(57) ABSTRACT

The present application discloses a display device, a backplane and the mold for manufacturing the backplane bracket. The mold is used to imprint molding the sheet raw material; the mold has an elongated imprint mold structure; the two ends of the imprint mold structure have a male and female interworking mold structures; by placing the raw material with different lengths in a plurality of predetermined positions in the imprint mold structure can form a plurality of brackets for combining to a backplane. The present application provides a backplane and the simplified mold structures for manufacturing the backplane bracket, the process to manufacturing the backplane is simplified. By adapting a set of mold can manufacture a plurality of the needed bracket to form a backplane, which greatly reduces the cost of production.

8 Claims, 3 Drawing Sheets

(51) Int. Cl.
*H05K 5/00* (2006.01)
*G06F 1/16* (2006.01)
*B29C 59/02* (2006.01)
*G02F 1/1337* (2006.01)
*G02F 1/13* (2006.01)
*G02F 1/017* (2006.01)
*G02F 1/35* (2006.01)
*G02F 1/13357* (2006.01)
*G02F 1/137* (2006.01)
*H05K 5/02* (2006.01)
*B29L 31/34* (2006.01)

(52) U.S. Cl.
CPC .......... *G02F 1/1333* (2013.01); *G02F 1/1337* (2013.01); *G02F 1/3532* (2013.01); *B29L 2031/3475* (2013.01); *G02F 1/133617* (2013.01); *G02F 2001/01791* (2013.01); *G02F 2001/13712* (2013.01); *G02F 2001/133628* (2013.01); *G02F 2202/10* (2013.01); *G02F 2202/36* (2013.01); *H05K 5/02* (2013.01); *Y10T 428/10* (2015.01); *Y10T 428/1005* (2015.01)

(58) Field of Classification Search
CPC .. G02F 2001/017; G02F 2001/133628; H05K 5/0017
USPC ...... 349/56, 58, 59, 64; 361/679.21, 679.22, 361/679.26; 248/220.1, 220.21, 917; 21/26
See application file for complete search history.

(56) References Cited

U.S. PATENT DOCUMENTS

| | | | |
|---|---|---|---|
| 9,137,909 B2* | 9/2015 | Kuo | .......................... H05K 5/02 |
| 9,170,446 B2* | 10/2015 | Kuo | ................. G02F 1/133308 |
| 9,207,710 B2* | 12/2015 | Huang | ............. G02F 1/133308 |
| 2013/0126450 A1 | 5/2013 | Kuo et al. | |
| 2013/0128514 A1 | 5/2013 | Hsiao et al. | |
| 2014/0016061 A1* | 1/2014 | Kuo | .......................... H05K 5/02 349/58 |
| 2014/0026381 A1 | 1/2014 | Kuo et al. | |
| 2014/0043793 A1 | 2/2014 | Kuo et al. | |
| 2014/0063698 A1 | 3/2014 | Huang et al. | |

* cited by examiner

DISPLAY APPARATUS, BACKPLANE AND MOLD FOR MAKING BACKPLANE BRACKET

FIELD OF THE INVENTION

The present application relates to a display technology field, and more particularly to a display apparatus, a backplane and mold for making backplane bracket.

BACKGROUND OF THE INVENTION

The conventional liquid crystal display apparatus includes a front frame, a panel and a backlight module, wherein the backlight module includes a back plate, a reflective sheet, a light guide plate and lamps.

Currently, there are many size of the display panel in the market in order to meet the different needs of people. For example, in the field of television, the liquid crystal panel sizes include 31.5, 42, 46, 48 or 55-inch. The mode for making the backplane with different sizes are needed to be set according to the different sizes of the liquid crystal panel.

Referring to FIG. 1, FIG. 1 illustrates a schematic structure of a monolithic backplane in the conventional technology.

As illustrated in FIG. 1, the backplane 20 in the conventional technology is mostly adapted as a monolithic type. The monolithic backplane 20 is usually produced by metal stamping or plastic injection. The monolithic backplane 20 need to consume much material, high cost of materials. In addition, the large size monolithic backplane 20 requires the use of larger stamping equipment. The size of the mold corresponding to the backplane 20 is large, structure is complicated, costs of the backplane and the mode are high.

Further, using a plurality of brackets to splice and form a backplane is provided in the conventional technology. But using a plurality of modes to manufacturing brackets with different specification is usually adapted, the mold more, resulting in higher costs.

SUMMARY OF THE INVENTION

The present application discloses a display device, a backplane and the mold for manufacturing the backplane bracket to solve the conventional technology problems such as the complicated structure of the backplane and the mold, the much quantity of the needed mold, and the high cost.

In order to solve the questions mentioned above, the technology approach adapted by this application is providing a display device, the display device including a display panel and a backplane, wherein the backplane is spliced by a plurality of brackets; the plurality of the brackets comprising a long backplane bracket and multiple short backplane bracket; the long backplane bracket has imprint structures comprising an interworking male and female mold structures in the two end of the long backplane bracket; and the plurality of the cross-sectional structures of the multiple short backplane brackets and the long backplane bracket are the same.

In order to solve the questions mentioned above, the technology approach adapted by this application is providing a mold for manufacturing a backplane bracket, wherein the mold is used to imprint molding the sheet raw material; the mold has an elongated imprint mold structure; the two ends of the imprint mold structure have a male and female interworking mold structures; by placing the raw material with different lengths in a plurality of predetermined positions in the imprint mold structure can form a plurality of brackets for combining to a backplane.

In a preferred embodiment of the present application, the male and female interworking mold structures can be a single or multiple rows of L-shaped imprint structure; the corner of the L-shaped imprint structure is located in the end area of the imprint mold structure; the longer side of the L-shaped imprint structure is disposed in the longitudinal direction of the imprint mold structure; and the shorter side of the L-shaped imprint structure is provided in the width direction of the imprint mold structure.

In a preferred embodiment of the present application, a raw material with a first length is put into the mold to integrally imprint and form a long backplane bracket;

a raw material with a second length is put into the mold to imprint and form a right side backplane bracket;

a raw material with a second length is put into the mold to imprint and form a left side backplane bracket;

wherein the left end of the long backplane bracket has a L-shaped male imprint structure, the right end of the long backplane bracket has a female L-shaped imprint structure;

the left side backplane bracket has a female L-shaped imprint structure;

the right side backplane bracket has a male L-shaped imprint structure;

wherein the female L-shaped imprint structure in the left side backplane bracket is stacked on the top surface of the left end of the long backplane bracket and form a large L-type reinforcing structure with the male L-shaped imprint structure in the left side of the long backplane bracket; and the male L-shaped imprint structure in the right side backplane bracket is stacked on the bottom surface of the right end of the long backplane bracket and form a large L-type reinforcing structure with the female L-shaped imprint structure in the right side of the long backplane bracket.

In a preferred embodiment of the present application, a raw material with the third length is put into the mold to imprint and form the intermediate backplane bracket; and a raw material with the fourth length is put into the mold to integrally imprint and form the wall handing backplane bracket.

In a preferred embodiment of the present application, the imprint mold structure further includes a plurality of the reinforce ribs formed on the long backplane bracket, the left side backplane bracket, the right side backplane bracket, the intermediate backplane bracket, and/or the wall handing backplane bracket.

In order to solve the questions mentioned above, the technology approach adapted by this application is providing a backplane, wherein the backplane is spliced by a plurality of brackets; the plurality of the brackets comprising a long backplane bracket and multiple short backplane bracket; the long backplane bracket has imprint structures comprising an interworking male and female mold structures in the two end of the long backplane bracket;

and the plurality of the cross-sectional structures of the multiple short backplane brackets and the long backplane bracket are the same.

In a preferred embodiment of the present application, the male and female interworking mold structures can be a single or multiple rows of L-shaped imprint structure; the corner of the L-shaped imprint structure is located in the end area of the imprint mold structure; the longer side of the L-shaped imprint structure is disposed in the longitudinal direction of the imprint mold structure; and the shorter side of the L-shaped imprint structure is provided in the width direction of the imprint mold structure.

In a preferred embodiment of the present application, the long backplane bracket has a first length, the left side of the long backplane bracket has a male L-shaped imprint structure and the right side of the long backplane bracket has a female L-shaped imprint structure;

the short bracket including a left side backplane bracket and a right side backplane bracket, the left side backplane bracket and the right side backplane bracket have a second length; the left side backplane bracket has a female imprint structure;

the right side backplane bracket has a male imprint structure;

wherein the female L-shaped imprint structure in the left side backplane bracket is stacked on the top surface of the left end of the long backplane bracket and form a large L-type reinforcing structure with the male L-shaped imprint structure in the left side of the long backplane bracket; and the male L-shaped imprint structure in the right side backplane bracket is stacked on the bottom surface of the right end of the long backplane bracket and form a large L-type reinforcing structure with the female L-shaped imprint structure in the right side of the long backplane bracket.

In a preferred embodiment of the present application, the short bracket further including an intermediate bracket and a wall handing bracket, wherein the intermediate bracket has a third length, and the wall handing bracket has a fourth length.

In a preferred embodiment of the present application, the reinforce ribs are formed on the long backplane bracket, the left side backplane bracket, the right side backplane bracket, the intermediate backplane bracket, and/or the wall handing backplane bracket.

The advantage of the present application is comparing to the conventional technology, the display device, the backplane and the simplified mold structures for manufacturing the backplane bracket, the process to manufacturing the backplane is simplified. By adapting a set of mold can manufacture a plurality of the needed bracket to form a backplane, which greatly reduces the cost of production.

BRIEF DESCRIPTION OF THE DRAWINGS

In order to more clearly illustrate the embodiments of the present application or prior art, the following figures will be described in the embodiments are briefly introduced. It is obvious that the drawings are merely some embodiments of the present application, those of ordinary skill in this field can obtain other figures according to these figures without paying the premise.

DETAILED DESCRIPTION OF PREFERRED EMBODIMENTS

Embodiments of the present application are described in detail with the technical matters, structural features, achieved objects, and effects with reference to the accompanying drawings as follows. It is clear that the described embodiments are part of embodiments of the present application, but not all embodiments. Based on the embodiments of the present application, all other embodiments to those of ordinary skill in the premise of no creative efforts obtained should be considered within the scope of protection of the present application.

Specifically, the terminologies in the embodiments of the present application are merely for describing the purpose of the certain embodiment, but not to limit the invention. Examples and the claims be implemented in the present application requires the use of the singular form of the book "an", "the" and "the" are intend to include most forms unless the context clearly dictates otherwise. It should also be understood that the terminology used herein that "and/or" means and includes any or all possible combinations of one or more of the associated listed items.

Figure 3:
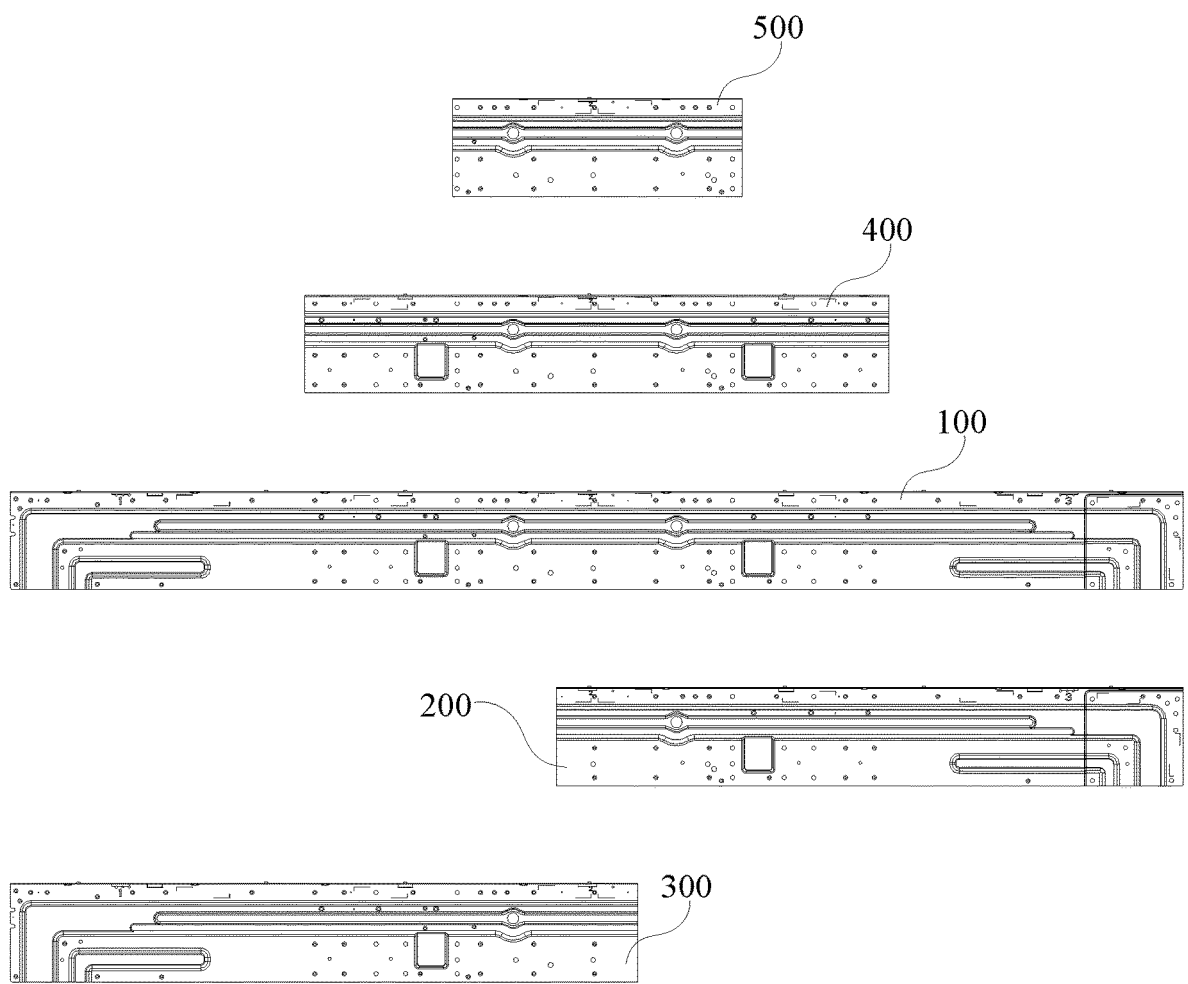
FIG. 3 is a schematic structure of the brackets according to an embodiment of the present application.

Referring to FIG. 3, FIG. 3 is a schematic structure of the brackets according to an embodiment of the present application.

By the correspondence of each bracket structure shown in FIG. 3, the person skilled in the art can understand the general structure and design ideas of the mode provided in the present application.

The present application provides a mold for manufacturing backplane bracket, the mold is used to imprint molding the sheet raw material. The mold has an elongated imprint mold structure, for example, the imprint mold structure corresponding to form a long backplane bracket 100 shown in FIG. 3. The two ends of the imprint mold structure have a male and female interworking mold structures such as the male and female mold structures for forming the two ends of the long backplane bracket 100 shown in FIGS. 2-3 (the imprint sizes are coupled). By placing the raw material with different lengths in a plurality of predetermined positions in the imprint mold structure can form a plurality of brackets for combining the backplane.

Figure 1:
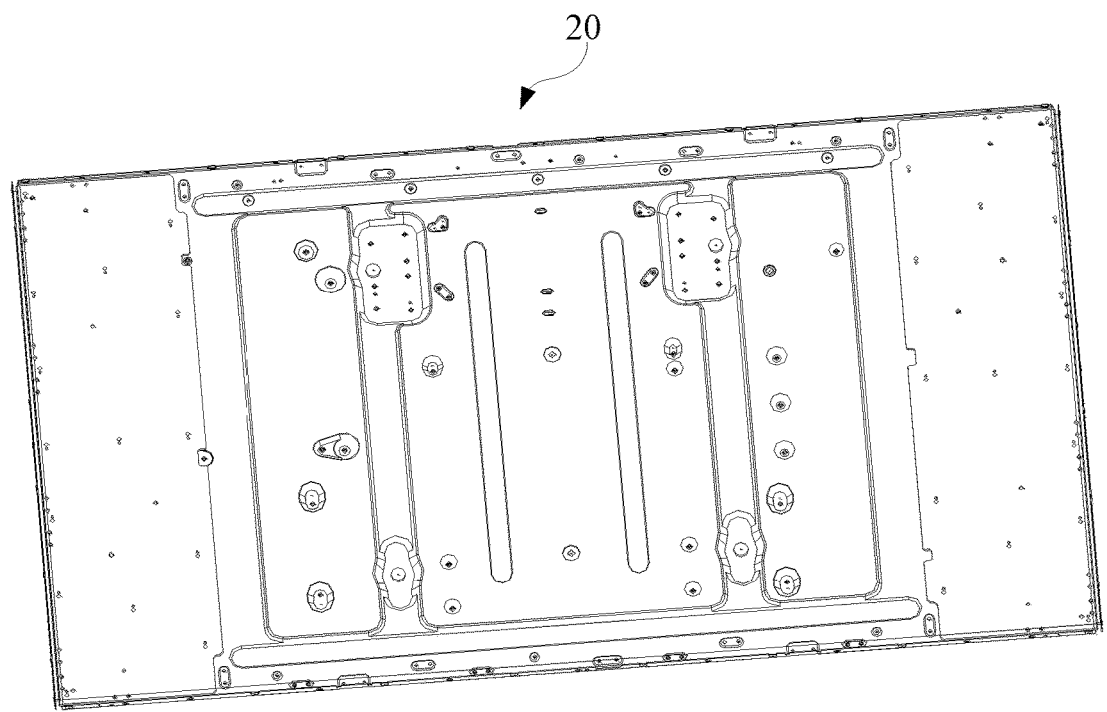
FIG. 1 illustrates a schematic structure of a monolithic backplane in the conventional technology.
Figure 2:
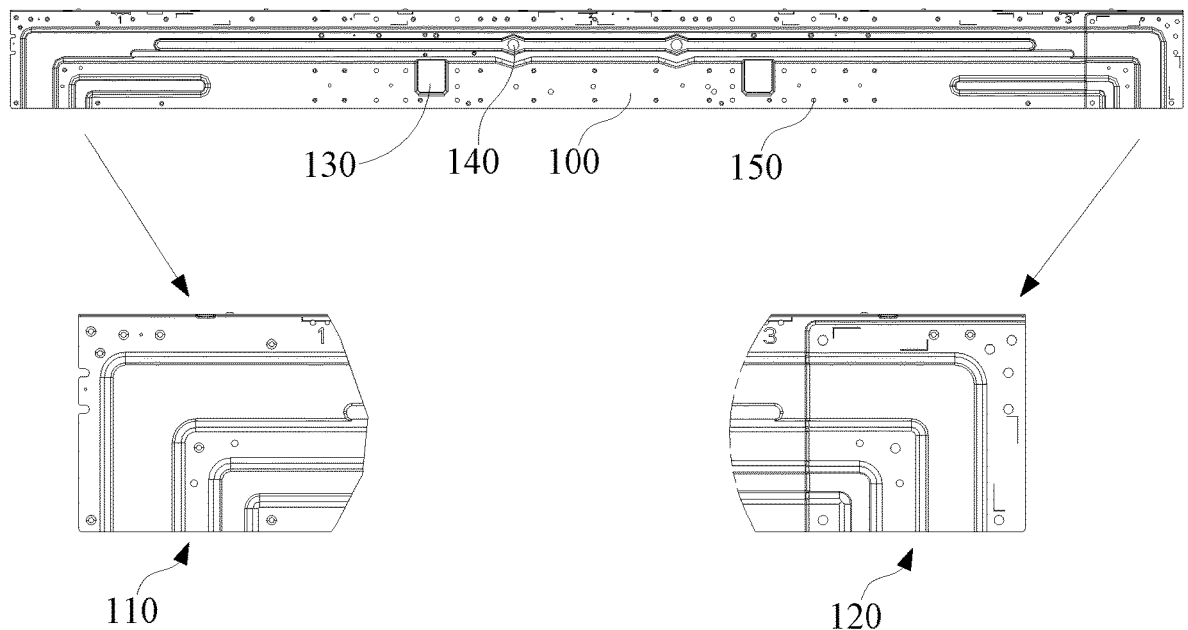
FIG. 2 is a schematic structure of a long backplane bracket and an enlarged end portion according to an embodiment of the present application.

Please also referring to FIG. 2, the male and female interworking mold structures described above can be a single or multiple rows of L-shaped imprint structure, the corner of the L-shaped imprint structure is located in the end area of the imprint mold structure, preferably, the corner of the L-shaped imprint structure is in the end square region of the imprint mold structure. The longer side 110 of the L-shaped imprint structure is disposed in the longitudinal direction of the imprint mold structure, the shorter side 120 of the L-shaped imprint structure is provided in the width direction of the imprint mold structure.

In the embodiment of the present application, the raw material of the first length is put into the mold to integrally imprint and form the long backplane bracket 100, wherein the first length is corresponding to the imprint mold structure, and the length and width of the raw material of the of the first length is substantially the same with the imprint mold structure. The raw material in a second length is put in the right side of the mold to form the left side backplane bracket 200 by imprint. The raw material in a second length is put in the left side of the mold to form the right side backplane bracket 300 by imprint, wherein the left end of the long backplane bracket 100 has a L-shaped male imprint structure 110, the right end of the long backplane bracket 100 has a female L-shaped imprint structure 120; the left side backplane bracket 200 has a corresponding female L-shaped imprint structure 120; the right side backplane bracket 300 has a corresponding male L-shaped imprint structure 110; wherein the second length is about half of the first length, depending on the size of the backplane requirements.

Figure 4:
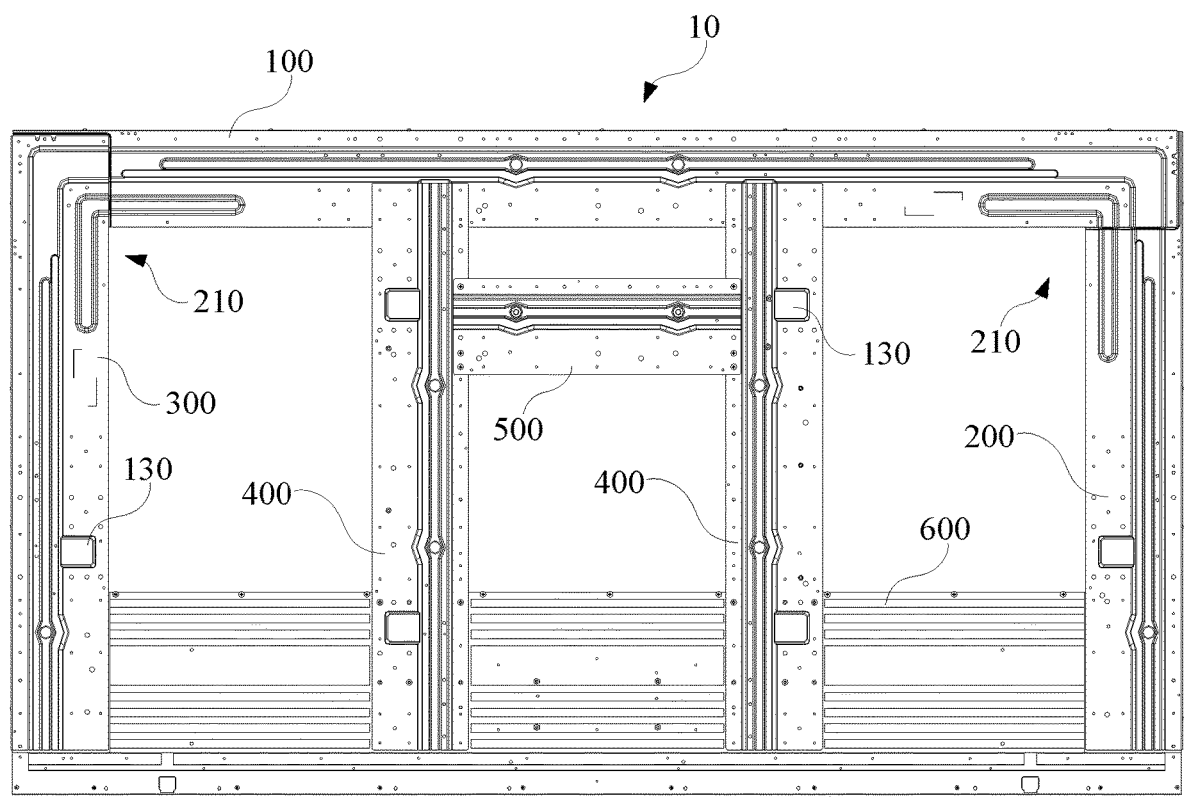
FIG. 4 is a schematic structure of the back surface of the backplane according to an embodiment of the present application.

Please also referring to FIG. 4, the female L-shaped imprint structure 120 in the left side backplane bracket 200 is stacked on the top surface of the left end of the long backplane bracket 100 and form a large L-type reinforcing structure 210 with the male L-shaped imprint structure 110 in the left side of the long backplane bracket 100. The male L-shaped imprint structure 110 in the right side backplane bracket 300 is stacked on the bottom surface of the right end of the long backplane bracket 100 and form a large L-type reinforcing structure 220 with the female L-shaped imprint structure 120 in the right side of the long backplane bracket 100.

Further, the raw material with the third length can be placed in the middle of the mold and form the intermediate backplane bracket 400 by imprinting. The raw material with the fourth length can be placed in the middle of the mold and form the wall handing backplane bracket 500 by imprinting. Wherein the third length and the second length can be the same, the fourth length is depended on the width of the intermediate backplane bracket 400.

The imprint mold structure further includes a plurality of reinforce rib forming structures and forms the reinforce ribs 130 on the long backplane bracket 100, the left side backplane bracket 200, the right side backplane bracket 300, the intermediate backplane bracket 400, and/or the wall handing backplane bracket 500. Besides, the above-described imprint mold structure further includes a plurality of punched structures, the punched structure can include a plurality of large and small punched holes with different specifications. A plurality of large holes 140 and small holes 150 are formed on the plurality of the brackets to extend the mounting structure.

Please referring to FIG. 2 to FIG. 4, the present application provides a backplane 10, the backplane 10 is spliced by a plurality of brackets. The plurality of the brackets is formed by imprint by the set of the molds described above. The plurality of the brackets includes a long backplane bracket 100 and multiple short backplane bracket. The long backplane bracket 100 has imprint structures including the interworking male and female mold structures in the two end of the long backplane bracket 100, the plurality of the cross-sectional structures of the multiple short backplane brackets and the long backplane bracket 100 are the same.

In an embodiment, as illustrated in FIG. 2, the male and female interworking mold structures can be a single or multiple rows of L-shaped imprint structure, the corner of the L-shaped imprint structure is located in the end area of the imprint mold structure, preferably, the corner of the L-shaped imprint structure is in the end square region of the imprint mold structure. The longer side 110 of the L-shaped imprint structure is disposed in the longitudinal direction of the imprint mold structure, the shorter side 120 of the L-shaped imprint structure is provided in the width direction of the imprint mold structure.

The long backplane bracket 100 has a first length, the left side of the long backplane bracket 100 has a male L-shaped imprint structure 110 (narrower imprint width). The right side of the long backplane bracket 100 has a female L-shaped imprint structure 120 (wider imprint width); preferably, the overall right side of the long backplane bracket 100 is in a convex profiled, so that the whole backplane 10 is relatively flat when the female L-shaped imprint structure 120 is coupled to the male L-shaped imprint structure 110.

The short bracket includes the left side backplane bracket 200 and the right side backplane bracket 300, the structure of the left side backplane bracket 200 is the same as the structure of the right side of the long backplane bracket 100, the structure of the right side backplane bracket 300 is the same as the structure of the left side of the long backplane bracket 100, and are formed by the adaption of the same set of mold structure. The left side backplane bracket 200 and the right side backplane bracket 300 have a second length; wherein the second length is about half of the first length.

Accordingly, the left side backplane bracket 200 has a female imprint structure 120, the right side backplane bracket 300 has a male imprint structure 110.

As illustrated in FIG. 4, the female L-shaped imprint structure 120 in the left side backplane bracket 200 is stacked on the top surface of the left end of the long backplane bracket 100 and form a large L-type reinforcing structure 210 with the male L-shaped imprint structure 110 in the left side of the long backplane bracket 100. The male L-shaped imprint structure 110 in the right side backplane bracket 300 is stacked on the bottom surface of the right end of the long backplane bracket 100 and form a large L-type reinforcing structure 220 with the female L-shaped imprint structure 120 in the right side of the long backplane bracket 100.

In addition, the short bracket further includes the intermediate bracket 400 and the wall handing bracket 500. The structure of the intermediate bracket 400 and the wall handing bracket 500 is the same with the middle portion of the long backplane bracket 100. The intermediate bracket 400 has a third length, the wall handing bracket 500 has a fourth length. Wherein the third length and the second length can be the same, the fourth length is depended on the width of the intermediate backplane bracket 400. The intermediate backplane bracket 400 can be two as illustrated or more. The intermediate backplane bracket 400 can be parallel disposed to the right side backplane bracket 300 or the intermediate backplane bracket 400 can be longer and parallel disposed to the long backplane bracket 100, or the intermediate backplane bracket 400 can be obliquely provided in the box body formed by the long backplane bracket 100, the left side backplane bracket 200 and the right side backplane bracket 300. In addition, the backplane 10 also includes an aluminum extrusion 600 provided in the bottom, the aluminum extrusion 600 is connected to the plurality of the brackets by a plurality of setting hole structures.

The reinforce ribs 130, and the plurality of large holes 140 and small holes 150 are formed on the long backplane bracket 100, the right side backplane bracket 300, the left side backplane bracket 200, the intermediate backplane bracket 400, and/or the wall handing backplane bracket 500 to extend the mounting structure.

Figure 5:
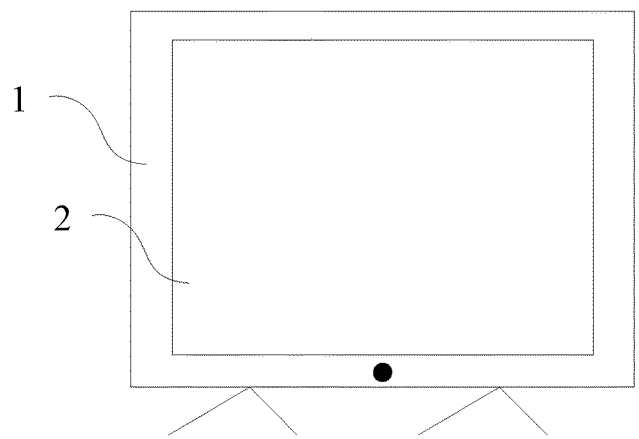
FIG. 5 is a simplified schematic structure of the display apparatus according to an embodiment of the present application.

Referring to FIG. 5, is a simplified schematic structure of the display apparatus according to an embodiment of the present application.

The present application further provides a display device, the display device includes a front frame 1, a display panel 2 and the backplane described above.

In summary, the person skilled in the art can understand the present application provides a display device, a backplane 10 and the simplified mold structures for manufacturing the backplane bracket, the process to manufacturing the backplane 10 is simplified. By adapting a set of mold can manufacture a plurality of the needed bracket to form a backplane 10, which greatly reduces the cost of production.

Above are embodiments of the present application, which does not limit the scope of the present application. Any modifications, equivalent replacements or improvements within the spirit and principles of the embodiment described above should be covered by the protected scope of the invention.

What is claimed is:

1. A display device, comprising a display panel and a backplane, wherein the backplane is spliced by a plurality of brackets, each of the plurality of the brackets is a straight strip; the plurality of the brackets comprising a long backplane bracket and multiple short backplane bracket; the long backplane bracket has imprint structures comprising a male structure and a female structure, wherein the male structure is arranged at a first end of the long backplane bracket and the female structure is arranged at a second end opposite to the first end of the long backplane bracket, the male structure is a pattern different from the female structure, and the male structure and the female structure have the capability of being interworked with each other, each of the multiple short backplane brackets is same with a corresponding part of the long backplane bracket, such that the plurality of the brackets are manufactured by a same mold;

wherein each of the male structure and female structure comprises a single or multiple rows of L-shaped imprint pattern; the corner of the L-shaped imprint pattern is located in an end area of the long backplane bracket; the longer side of the L-shaped imprint pattern is disposed in the longitudinal direction of the long backplane bracket; and the shorter side of the L-shaped imprint pattern is provided in the width direction of the long backplane bracket.

2. The display device according to claim 1, wherein
the long backplane bracket has a first length, the left side of the long backplane bracket has a male L-shaped imprint pattern and the right side of the long backplane bracket has a female L-shaped imprint pattern;
the short bracket comprising a left side backplane bracket and a right side backplane bracket, the left side backplane bracket is same with a right portion of the long backplane bracket, the right side backplane bracket is same with a left portion of the long backplane bracket, the left side backplane bracket and the right side backplane bracket have a second length;
the left side backplane bracket has a female L-shaped imprint pattern;
the right side backplane bracket has a male L-shaped imprint pattern;
wherein the female L-shaped imprint pattern in the left side backplane bracket is stacked on the top surface of the left end of the long backplane bracket and form a large L-type reinforcing structure with the male L-shaped imprint structure in the left side of the long backplane bracket; and
the male L-shaped imprint pattern in the right side backplane bracket is stacked on the bottom surface of the right end of the long backplane bracket and form a large L-type reinforcing structure with the female L-shaped imprint structure in the right side of the long backplane bracket.

3. The display device according to claim 2, wherein the short bracket further comprising an intermediate bracket and a wall handing bracket, wherein the intermediate bracket is same with a first middle portion of the long backplane bracket, the wall handing bracket is same with a second middle portion of the long backplane bracket, the intermediate bracket has a third length, and the wall handing bracket has a fourth length.

4. The display device according to claim 3, further comprising forming reinforce ribs on the long backplane bracket, the left side backplane bracket, the right side backplane bracket, the intermediate backplane bracket, and/or the wall handing backplane bracket.

5. A backplane, wherein the backplane is spliced by a plurality of brackets, each of the plurality of the brackets is a straight strip; the plurality of the brackets comprising a long backplane bracket and multiple short backplane bracket; the long backplane bracket has imprint structures comprising a male structure and a female structure, wherein the male structure is arranged at a first end of the long backplane bracket and the female structure is arranged at a second end opposite to the first end of the long backplane bracket, the male structure is a pattern different from the female structure, and the male structure and the female structure have the capability of being interworked with each other, each of the multiple short backplane brackets is same with a corresponding part of the long backplane bracket, such that the plurality of the brackets are manufactured by a same mold;

wherein each of the male structure and female structure comprises a single or multiple rows of L-shaped imprint pattern; the corner of the L-shaped imprint pattern is located in an end area of the long backplane bracket; the longer side of the L-shaped imprint pattern is disposed in the longitudinal direction of the long backplane bracket; and the shorter side of the L-shaped imprint pattern is provided in the width direction of the long backplane bracket.

6. The backplane according to claim 5, wherein
the long backplane bracket has a first length, the left side of the long backplane bracket has a male L-shaped imprint pattern and the right side of the long backplane bracket has a female L-shaped imprint pattern;
the short bracket comprising a left side backplane bracket and a right side backplane bracket, the left side backplane bracket is same with a right portion of the long backplane bracket, the right side backplane bracket is same with a left portion of the long backplane bracket, the left side backplane bracket and the right side backplane bracket have a second length;
the left side backplane bracket has a female L-shaped imprint pattern;
the right side backplane bracket has a male L-shaped imprint pattern;
wherein the female L-shaped imprint pattern in the left side backplane bracket is stacked on the top surface of the left end of the long backplane bracket and form a large L-type reinforcing structure with the male L-shaped imprint structure in the left side of the long backplane bracket; and
the male L-shaped imprint pattern in the right side backplane bracket is stacked on the bottom surface of the right end of the long backplane bracket and form a large L-type reinforcing structure with the female L-shaped imprint structure in the right side of the long backplane bracket.

7. The backplane according to claim 6, wherein the short bracket further comprising an intermediate bracket and a wall handing bracket, wherein the intermediate bracket is same with a first middle portion of the long backplane bracket, the wall handing bracket is same with a second middle portion of the long backplane bracket, the intermediate bracket has a third length, and the wall handing bracket has a fourth length.

8. The backplane according to claim 7, further comprising forming reinforce ribs on the long backplane bracket, the left side backplane bracket, the right side backplane bracket, the intermediate backplane bracket, and/or the wall handing backplane bracket.

* * * * *